W. DRURY.
PNEUMATIC TIRE.
APPLICATION FILED APR. 14, 1905.
898,850.
Patented Sept. 15, 1908.
2 SHEETS—SHEET 1.
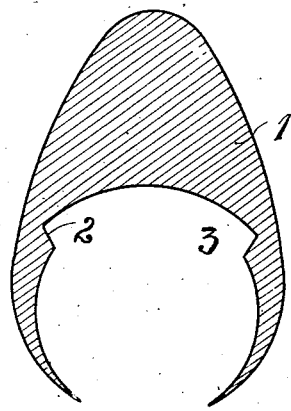
FIG. 1
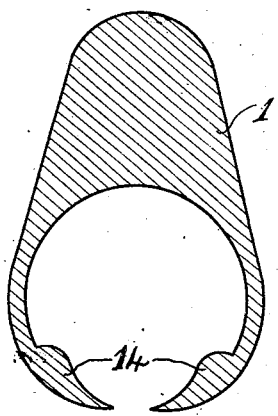
FIG. V
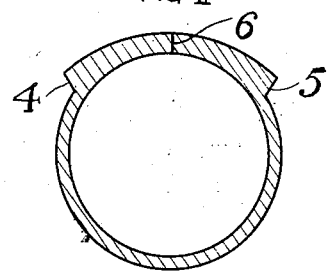
FIG. II
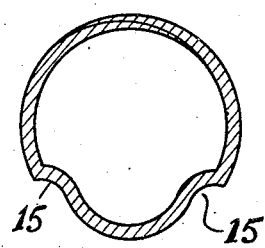
FIG. IV
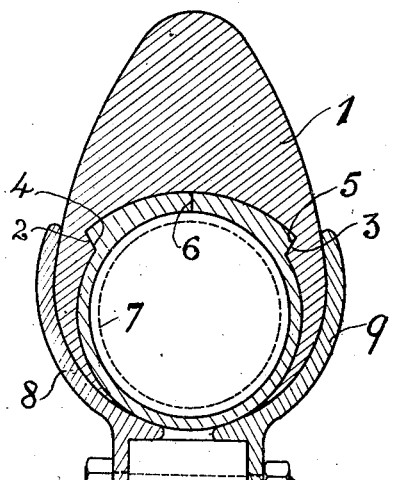
FIG. III
Witnesses.
William H. Stein
L. V. Sparks
Inventor.
William Drury
By William Drury
Attorney.

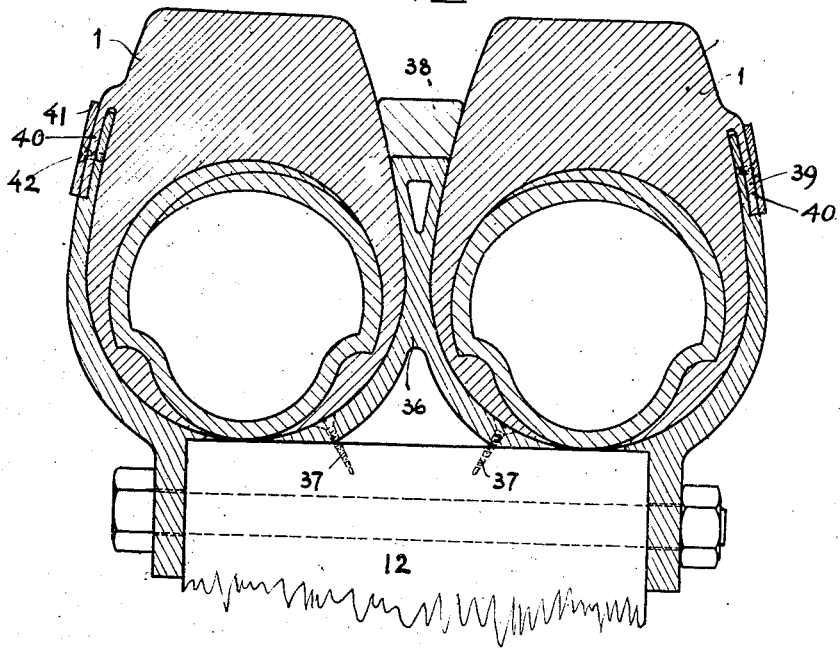
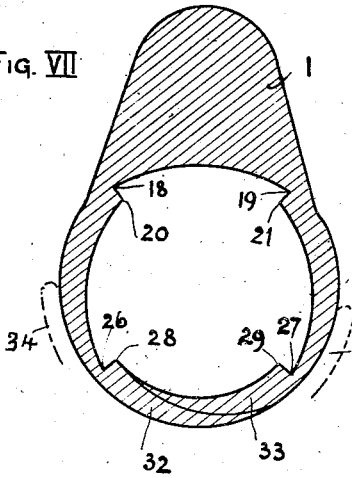
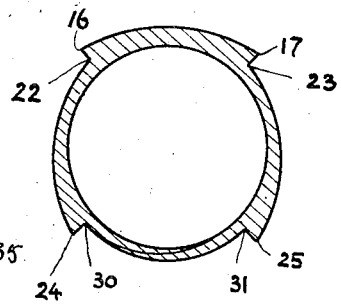

UNITED STATES PATENT OFFICE.

WILLIAM DRURY, OF SWANSEA, WALES, ENGLAND.

PNEUMATIC TIRE.

No. 898,850.      Specification of Letters Patent.      Patented Sept. 15, 1908.

Application filed April 14, 1905. Serial No. 255,520½.

*To all whom it may concern:*

Be it known that I, WILLIAM DRURY, a subject of the King of Great Britain and Ireland, residing at No. 29 Cradock street, Swansea, in the county of Glamorgan, Wales, England, have invented new and useful Improvements in Pneumatic Tires, of which the following is a specification.

My invention relates to improvements in pneumatic tires by means of which certain advantages are obtained.

My tire embraces two main parts, an outer cover which for purposes of distinction I shall term the tread cover, and an inner cover which for purposes of distinction I shall term the strain cover; and the distinguishing feature of these two main parts is that when placed in position with respect to one another and upon the wheel they interlock. This interlocking is effected or assisted by inflation. The inflation may take place in an ordinary inflation tube of the usual type, placed within the strain cover, but in one form of my invention the strain cover may itself constitute the inflation tube. I however prefer to employ an inflation tube wherever rough usage is expected.

In the accompanying drawings which illustrate certain preferred forms of my invention, Figure I, is the tread cover shown as separated from the strain cover. Fig. II shows a strain cover detached from the tread cover. Fig. III illustrates the tread and strain covers shown in Figs. I and II respectively placed in position one with respect to the other so as to interlock and fitted within the rim of a wheel. Figs. IV and V show respectively the strain cover and tread cover of a modified form of my invention. Figs. VI and VII are respectively the strain and tread cover of a further modification of my invention. Fig. VIII illustrates a twin tire.

Referring to Figs. I, II, and III, 1 is the tread cover having recesses 2, 3. Into these recesses the projections 4, 5, enter when the two covers are placed in position so as to interlock. This is easily effected by first placing the projection 4 within recess 2 and then moving projection 5 into the recess 3 so that the two covers interlock. This placing of the parts in position is facilitated by the division of the strain cover at the line or opening 6. After such placing in position as aforesaid and within the rim the parts take up the position shown in Fig. III. When an inflation tube is employed it takes up the position shown by the dotted circle 7 in Fig. III as will be readily understood. But it will be seen that with a strain cover within a tread cover as shown a separate inflation tube may be dispensed with, in which case the division 6 is also preferably dispensed with. The rim shown in Fig. III consists of two steel halves 8 and 9 attached by the flanges 10, 11, to the felly 12 by means of a bolt and nut as shown.

In Figs. IV and V it will be seen that the projections 14 nest within the recesses 15 and are placed close to the inner part of the tire instead of being placed close to the periphery as shown in Fig. III. This is a stronger form of construction for when the parts are in position within the rim and fully inflated much greater strains can be withstood without tearing the two covers apart. The tire shown in Figs. IV and V is therefore designed for heavier and harder work than that shown in Figs. I and II. When still greater strains have to be dealt with I adopt the plan shown in Figs. VI and VII, VI being a strain cover and VII a tread cover. In this form it will be seen that there is a double set of projections and recesses the projections 16, 17, nesting within the recesses 18, 19, the projections 20, 21, within the recesses 22, 23, the projections 24, 25, within the recesses 26, 27, and the projections 28, 29, within the recesses 30, 31. It will be seen that the tread cover shown in Fig. VII differs from those shown in Figs. I and V not only in having a double set of projections and recesses but also in the fact that its inner portion consists of two overlapping parts 32, 33. This overlapping not only reduces the importance of employing a separate inflation tube but it adds considerably to the strength of construction. But even in this form I still prefer to employ a separate inflation tube. The dotted lines 34, 35, indicate the edges of the rim. Studs of the usual kind to prevent creeping may be employed if desired.

In Fig. VIII I illustrate a form of twin tire suitable for heavy wagons or lorries. In this figure 36 is a separating ring of steel attached to the felly 12 by the countersunk screws 37, 38 is a ring of rubber surrounding the ring 36 and lying between the treads of the twin tire. This figure also serves to illustrate a form of construction in which the rim is provided with annular recesses 39 designed for the reception of annular lugs of rubber with canvas insertion which are retained in the said recesses by the rings 41 secured by the screws 42. When desired I may use the lugs 40 not only with twin tires but with single tires in which case I may provide a lug on each side of the tread cover.

In practice I sometimes find it convenient to spread a thin layer of thin rubber solution on the outer surface of the strain cover or on the inner surface of the tread cover before putting these in their interlocking position. Such a layer does not prevent ready access to the interior of the tire when desired as the two parts mentioned can be readily stripped apart. Such a layer of solution diminishes the chances of relative creeping between the strain and the tread covers and is particularly applicable where there is only one set of projections and recesses.

Having thus described my invention what I claim as new and desire to secure by Letters Patent is:—

1. In a pneumatic tire, the combination of an inner strain cover divided longitudinally upon its outer part, an outer tread cover divided longitudinally upon its inner part, interlocking means intermediate between said covers, such means acting to interlock the parts under inflation, said interlocking means comprising longitudinally extending recesses and interlocking projections.

2. In a pneumatic tire, the combination of an inner strain cover divided longitudinally upon its outer part, an outer tread cover divided longitudinally upon its inner part, interlocking means intermediate between said covers, such means acting to interlock the parts under inflation, said interlocking means comprising longitudinally extending recesses on the inner walls of said tread cover and corresponding longitudinally extending projections on the outer walls of said strain cover.

3. In a pneumatic tire, the combination of an outer tread cover divided longitudinally, an inner strain cover divided longitudinally, and the latter nested within the former, and the longitudinal edges of one of said covers overlapping each other, and longitudinally extending interlocking recesses and corresponding projections on said respective covers interlocking with each other under inflation.

4. In a pneumatic tire, the combination of an outer interlocking tread cover divided longitudinally, an inner strain cover also divided longitudinally and nested within said outer cover, interlocking means intermediate between said covers and comprising longitudinally extending recesses and projections adapted to interlock with each other under inflation.

In witness whereof I have signed my name to this specification in the presence of two subscribing witnesses.

WILLIAM DRURY.

Witnesses:
H. D. JAMESON,
F. L. RAND.